United States Patent [19]

Bergeron

[11] 4,094,340

[45] June 13, 1978

[54] RELAY LOCK-OUT

[75] Inventor: Ned A. Bergeron, Houma, La.

[73] Assignee: B.W.B. Controls, Inc., Houma, La.

[21] Appl. No.: 749,745

[22] Filed: Dec. 13, 1976

[51] Int. Cl.² .............................................. F16K 17/00
[52] U.S. Cl. ........................... 137/625.66; 137/624.27; 137/625.6
[58] Field of Search ............ 137/624.27, 625.6, 625.66

[56] References Cited

U.S. PATENT DOCUMENTS

| | | | |
|---|---|---|---|
| 3,131,722 | 5/1964 | Abbott | 137/625.66 X |
| 3,253,516 | 5/1966 | Huntington | 137/625.66 X |
| 3,746,401 | 7/1973 | Stearns | 137/624.27 X |
| 3,781,065 | 12/1973 | Kersting | 137/624.27 X |
| 3,980,336 | 9/1976 | Bitonti | 137/624.27 X |

Primary Examiner—Harold W. Weakley
Attorney, Agent, or Firm—Robert W. B. Dickerson

[57] ABSTRACT

Device for providing a first signal to an actuator as a function of a further signal received from a further member, wherein on said device blocking said first signal, means other than said further signal are required to cause unblocking of said first signal.

3 Claims, 2 Drawing Figures

RELAY LOCK-OUT

BACKGROUND OF THE INVENTION

Many control devices are presently required relative to the production and/or distribution of energy sources such as hydrocarbons. Oftentimes, valves are caused to block a pipeline, as a function of the pressure within such line. A typical example would include an actuator causing valve opening or closing, such actuator in turn being controlled by a relay such as described by this invention, and such relay's operation being governed by a signal, hydraulic or pneumatic, received from a line pressure sensitive device, such as a pilot. Most prior art devices, after causing valve closure on loss of pilot signal occurring, have automatically caused valve re-opening, on the return of a pilot signal to the device. For various safety reasons, however, it has become most desirable to require manual resetting of the device after pilot signal failure in order to cause valve re-opening, rather than permit the mere return of pilot signal to cause such opening, i.e., to require a fail-safe lockout. Recent attempts at such an arrangement are exemplified by U.S. Pat. Nos. 3,877,484; 3,963,050; and 3,943,974. The present invention is intended to accomplish such a goal in a more efficient and economical manner.

SUMMARY OF THE INVENTION

A dual-positioned valve member is slidable within the axial bore of a housing from a closed position having a first piston positioned adjacent the housing end cap to an open position with said first position removed from said end cap. A control signal, such as hydraulic or pneumatic fluid from a pilot device, enters an inlet closely adjacent said end cap. When in said position, said signal tends to retain the valve member in its closed position, thereby preventing actuator activation. Hand grasp means are provided the valve member to permit physically moving such member from the closed to the open position.

DESCRIPTION OF A PREFERRED EMBODIMENT

Figure 1:
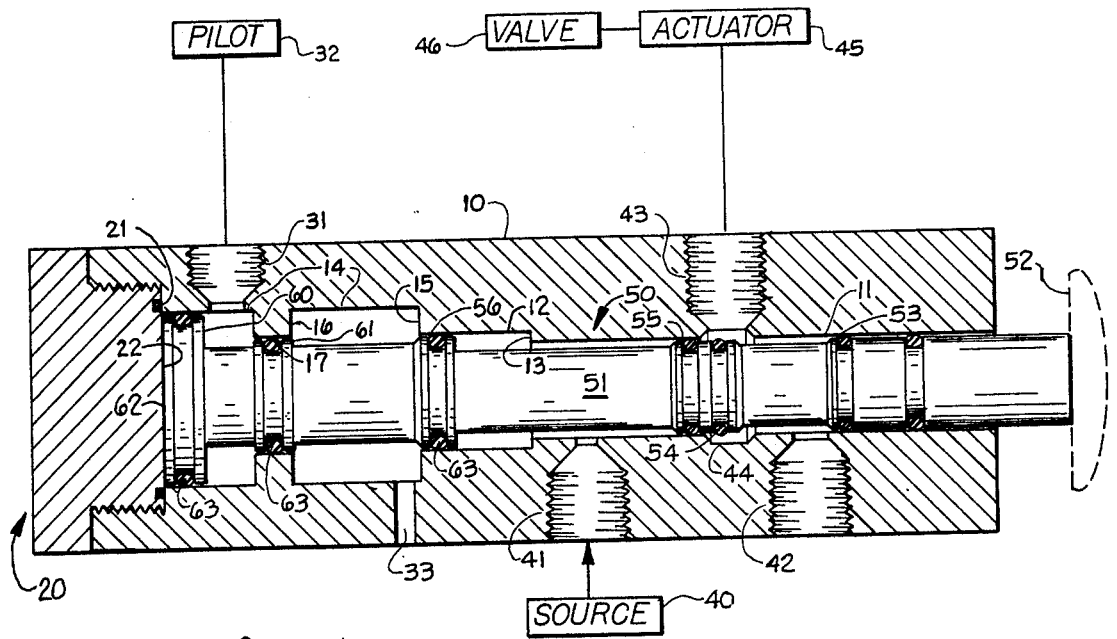
FIG. 1, is a partly schematic axial section through the relay, with the slide valve in closed position.

Housing 10 includes an axial bore therethrough, such bore including primary bore 11, first enlarged diameter bore 12 linked by shoulder 13 to central bore 11, second enlarged diameter bore 14 linked by shoulder 15 to enlarged portion 12. Bore 14 is centrally interrupted by radially directed annular ridge 16, having inwardly directed face 17. One end of said axial bore is closed by threaded end plug 20, which has annular seal 21 around inwardly directed face 22.

Pilot signal inlet 31 allows communication between a pilot 32 which may monitor line (not shown) pressure, and bore portion 14. The end of bore portion 14 opposite from inlet 31 is exhausted by passageway 33. A source 40 of actuator fluid is in communication with actuator signal inlet 41, and it in turn with primary bore 11. Bleed port 42 communicates between said primary bore 11 and the housing exterior. Intermediate members 41 and 42, actuator signal outlet 43 communicates between an annular enlargement 44 of bore 11 and actuator 45, such actuator controlling the opening and/or closing of valve 46, which may be positioned in a production line.

Slidable within the axial bore through housing 10 is valve member 50. This valve member includes a central stem portion 51 having a hand grasp knob 52 threadedly attached thereto at one end, O-ring seals spared along such stem at 53, 54, and 55, as well as first, second, and third pistons 60, 61, and 56, at the other end of such stem. Piston 60 is the larger of the pistons, and has a seating face 62. Each of such pistons carries a dynamic O-ring seal 63 around its radial extremity.

Figure 2:
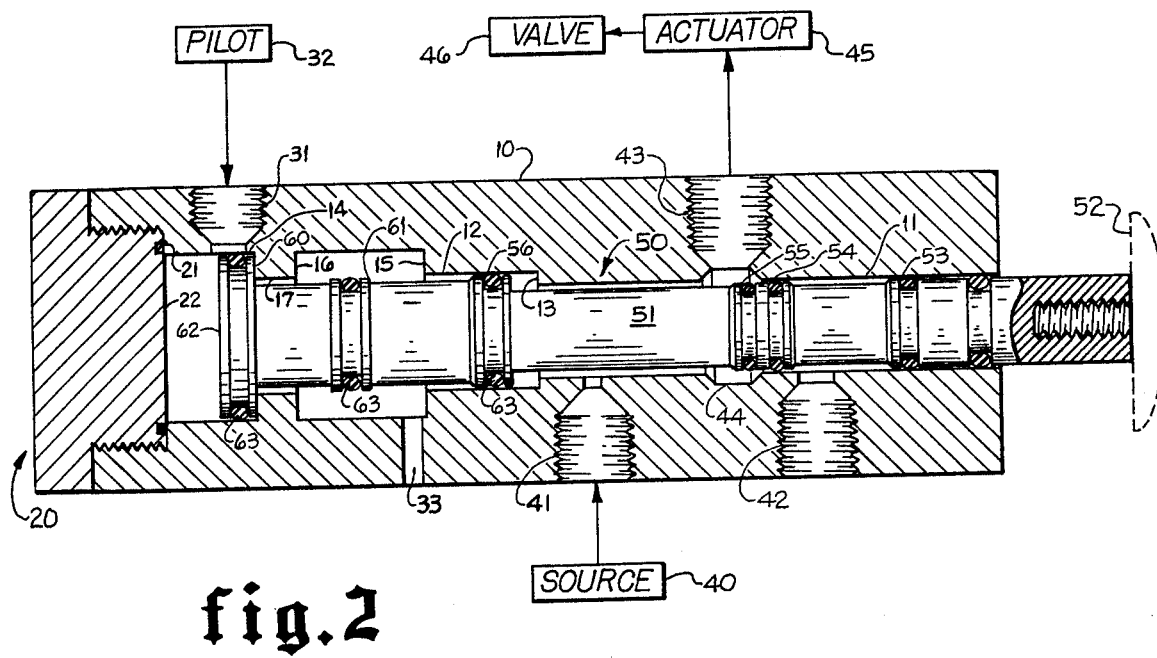
FIG. 2, is similar to FIG. 1, but with the slide valve in open position.

Consider now the operation of this invention. When operative, as in FIG. 2, actuator fluid or signal from source 40 enters inlet 41, out bore enlargement 44 and outlet 43 to actuator 45, which would cause opening of valve 46 in a conventional manner. At this time seal 63 carried by piston 60 would be sealed against enlarged bore portion 14, and such piston would abut ridge 16. Fluid or signal from pilot 32 through inlet 31 would tend to retain the slide valve member in such position.

Means are provided to bias the slide valve member toward the closed position of FIG. 1, comprising pressure from source 40 acting against piston 56, which is sealed by O-ring 63 against bore portion 12. Springs may be used as an additional bias source. On member 50 returning to the position of FIG. 1, i.e., no pilot signal, such as in the instance of a line break, pressure or signal subsequently re-entering inlet 31 would merely tend to retain piston 60 against end cap 20, thus requiring exterior force, such as a manual pull on knob 52 to reestablish communication between actuator signal inlet and outlet 41 and 43. Note that in the "closed" position, seal 63, carried by the smaller piston 61, seals against face 17 of ridge 16. Therefore, it is seen how an economical and fail save means are provided, wherein on pilot signal returning, such signal is not effective to result in valve reopening.

Although only a single embodiment has been described, it should be obvious that numberous modification are possible by one skilled in the art without departing from the spirit of the invention, the scope of which is limited only by the following claims.

I claim:

1. A device for controlling a first fluid signal from an actuator fluid supply to an actuator as a function of a further fluid signal received from a further fluid supply, comprising:

an axially bored housing;
said housing including further fluid signal inlet means communicating with said further fluid supply, first fluid signal outlet means communicating with said actuator, and first fluid signal inlet means;
slide valve member movable within said housing bore from a first position allowing communication between said actuator fluid supply and said actuator, to a second position blocking communication between said actuator fluid supply and said actuator; and
means preventing a fluid signal through said further fluid signal inlet means from causing said slide valve member to move from said second position to said first position, said preventing means including a) means for causing said fluid signal through said further fluid signal inlet to bias said slide valve member toward said second position whenever said slide valve member is in said second position, and b) means for causing said fluid signal from said actuator fluid supply to bias said slide valve member toward said second position at all times.

2. The device of claim 1, and including means exterior of said housing for effecting movement of said slide valve member from said second to said first position.

3. The device of claim 2, wherein said preventing means includes first larger and a second smaller piston on said slide valve member, each said piston being in fluid communication with said further fluid signal inlet means and sealingly engaged with said bore when said slide valve member is in said second position.

* * * * *